(12) United States Patent  
Sahara (10) Patent No.: US 9,398,187 B2  
(45) Date of Patent: Jul. 19, 2016

(54) IMAGE SCANNING APPARATUS HAVING TWO SCANNING UNITS

(75) Inventor: Shinya Sahara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 50 days.

(21) Appl. No.: 12/987,561

(22) Filed: Jan. 10, 2011

(65) Prior Publication Data

US 2011/0188098 A1    Aug. 4, 2011

(30) Foreign Application Priority Data

Jan. 29, 2010    (JP) ................................. 2010-018392

(51) Int. Cl.
*H04N 1/42* (2006.01)
*H04N 1/04* (2006.01)

(52) U.S. Cl.
CPC ...................................... *H04N 1/04* (2013.01)

(58) Field of Classification Search
CPC ....................................................... H04N 1/42
USPC ......................................... 358/408, 496–498
See application file for complete search history.

(56) References Cited

U.S. PATENT DOCUMENTS

| 4,621,921 | A * | 11/1986 | Takahata et al. ................. 399/19 |
| 6,362,870 | B2 * | 3/2002 | Mui et al. ......................... 355/24 |
| 7,924,475 | B2 * | 4/2011 | Suzuki ........................... 358/474 |
| 7,957,041 | B2 | 6/2011 | Baba |
| 2003/0184822 | A1 * | 10/2003 | Takaoka ........................ 358/498 |
| 2006/0139704 | A1 | 6/2006 | Baba |
| 2008/0130071 | A1 * | 6/2008 | Katsuyama ........ H04N 1/00326 358/498 |
| 2009/0168093 | A1 * | 7/2009 | Kim ............................. 358/1.15 |
| 2010/0053682 | A1 * | 3/2010 | Gotoh et al. ................. 358/1.15 |
| 2010/0110499 | A1 * | 5/2010 | Baba ............................. 358/451 |

FOREIGN PATENT DOCUMENTS

| JP | 09224105 A * | 8/1997 |
| JP | A-11-27444 | 1/1999 |
| JP | 2005-73036 | 3/2005 |

(Continued)

OTHER PUBLICATIONS

Notification of Reason for Refusal dated Dec. 27, 2011 received from the Japanese Patent Office from related Japanese Application No. 2010-018392, together with an English-language translation.

(Continued)

*Primary Examiner* — Marivelisse Santiago Cordero
*Assistant Examiner* — Kevin Ky
(74) *Attorney, Agent, or Firm* — Scully, Scott, Murphy & Presser, P.C.

(57) ABSTRACT

An image scanning apparatus having a feeding unit that feeds a document; a first scanning unit, which scans one face of the document fed, and which scans a document set on a document platen; a second scanning unit that scans the other face of the document fed; an instructing unit that, during a scanning operation being performed by a preceding-document scanning unit, which is one of the first scanning unit and the second scanning unit, instructs an other of the first scanning unit and the second scanning unit to scan a document not being scanned by the preceding-document scanning unit; and an executing unit that executes a scanning operation by a following-document scanning unit that is the other of the first scanning unit and the second scanning unit when the instructing unit instructs the other of the first scanning unit and the second scanning unit to start the scanning operation.

12 Claims, 7 Drawing Sheets

(56) References Cited

FOREIGN PATENT DOCUMENTS

| | | |
|---|---|---|
| JP | A-2006-128765 | 5/2006 |
| JP | A-2006-180347 | 7/2006 |

OTHER PUBLICATIONS

Chinese Office Action dated Mar. 14, 2013 issued in corresponding Chinese Patent Application No. 201110033147.7, together with English language translation.

* cited by examiner

DOCUMENT SCANNING GUIDANCE

PLEASE SET DOCUMENTS ON THE DOCUMENT INLET OF THE ADF

PLEASE MAKE A SCANNING FACE OF A DOCUMENT FACE DOWNWARD WHEN
  SETTING DOCUMENTS ON THE ADF

PLEASE PUSH THE START KEY AFTER SETTING THE DOCUMENTS

FIG. 7

IMAGE SCANNING APPARATUS HAVING TWO SCANNING UNITS

CROSS-REFERENCE TO RELATED APPLICATION

This application claims priority from Japanese Patent Application No. 2010-018392 filed on Jan. 29, 2010, the entire subject matter of which is incorporated herein by reference.

BACKGROUND

1. Technical Field

The invention relates to an image scanning apparatus performing a double-sided scanning operation. More specifically, the invention relates to an image scanning apparatus having at least two scanning units in which one scanning unit scans one surface of a document and the other scanning unit scans the other surface, thereby performing a double-sided scanning in one pass.

2. Background Art

In a related image scanning apparatus performing a double-sided scanning, the related image scanning apparatus that scans a front face and a reverse face of a document in one pass is known. For example, one of the related image scanning apparatuses is an image scanning apparatus having two scanning units on a document feed path wherein one scanning unit scans a front face of a document and the other scanning unit scans a reverse face thereof, thereby performing a double-sided scanning in one pass.

SUMMARY

However, the above-described image scanning apparatus has a problem. In the related image scanning apparatus having two scanning units on one document feed path, a one-sided scanning can be performed by only using the one scanning unit. However, in the one-sided scanning, the other scanning unit does not perform a scanning, so that the scanning units are not effectively used.

The present invention is made with consideration of the above problem in the related image scanning apparatus. An object of an exemplary embodiment of the invention is to provide an image scanning apparatus, which has a plurality of scanning units, effectively using the respective scanning units.

An image scanning apparatus includes a feeding unit that feeds a document; a first scanning unit, which scans one face of the document fed by the feeding unit, and which scans a document set on a document platen; a second scanning unit that scans the other face of the document fed by the feeding unit; an instructing unit that, during a scanning operation being performed by a preceding-document scanning unit, which is one of the first scanning unit and the second scanning unit, instructs an other of the first scanning unit and the second scanning unit to scan a document not being scanned by the preceding-document scanning unit that is the scanning unit being used in the scanning operation; and an executing unit that executes a scanning operation by using a following-document scanning unit that is the other of the first scanning unit and the second scanning unit when the instructing unit instructs the other of the first scanning unit and the second scanning unit to start the scanning operation by using the following-document scanning unit.

The image scanning apparatus has two scanning units (a first scanning unit, a second scanning unit) and performs a double-sided scanning in one pass. The first scanning unit is a scanning unit, which is provided below a document platen, for example, and which performs the scanning operation by moving in a sub-scanning direction below the document platen when scanning a document set on the document platen. On the other hand, the first scanning unit performs the scanning while being fixed at a predetermined position when scanning a document fed from the feeding unit. In the meantime, the second scanning unit is a scanning unit, which is fixed in the feeding unit, and which scans the other face different from the one face scanned by the first scanning unit, in a document fed by the feeding unit, for example. When one scanning unit is performing the scanning, the other scanning unit may be instructed to be used for scanning and performs the scanning according to the instruction.

In other words, the image scanning apparatus executes a following-job using the other scanning unit during execution of a preceding-job which uses only one scanning unit. Namely, two different jobs including the document scanning are performed at the same time by the different scanning units. Accordingly, both the scanning units are enabled to scan at the same time, so that both the scanning units may be effectively used.

Additionally, in the image scanning apparatus of exemplary aspects of the invention, the preceding-document scanning unit may be the first scanning unit, and the following-document scanning unit may be the second scanning unit. According to this configuration, the image scanning apparatus may have a higher scanning stability and a higher serviceability, as compared to a case where the preceding-document scanning unit is the second scanning unit.

Additionally, the image scanning apparatus of exemplary aspects of the invention may include a notifying unit that provides a notification of a document surface to be scanned when the executing unit executes the scanning operation. When executing the following-job, one scanning unit is already used for the preceding-job and the using thereof is limited. Accordingly, it is preferable to notify a document surface to be scanned in the other scanning unit.

Additionally, the image scanning unit of exemplary aspects of the invention may include a limiting unit, which limits a start instruction of a scanning operation by using the same scanning unit as the preceding-document scanning unit, when the instructing unit sends an instruction to start the scanning operation. If using the same scanning unit as the preceding-document scanning unit is being used, it is disadvantageous to a user using the preceding-document scanning unit. Thus, such instruction of scanning process is to be limited. The instruction to perform the scanning operation by using the same scanning unit as the preceding-document scanning unit includes an instruction to start a double-sided scanning operation, for example. In addition, the limiting method may include a method in which scanning with the same scanning unit cannot be instructed and a method in which such instruction is canceled after the instruction, for example.

Additionally, the image scanning apparatus of exemplary aspects of the invention may have a requesting unit that requests interrupting of the scanning operation by the preceding-document scanning unit, when the executing unit executes the scanning operation. When the requesting unit requests the interrupting, the scanning operation by the following-document scanning unit may start after interrupting the scanning of the preceding-document scanning unit. For example, when the urgency of the following-job is higher than that of the preceding-job, it may be preferable to stop the scanning operation by the preceding-document scanning unit and to perform the scanning of the following-job.

Additionally, the image scanning apparatus may have a restarting unit that cancels the interrupting and restarts the scanning operation by the preceding-document scanning unit, when the scanning operation by the executing unit is completed. Accordingly, it is possible to appropriately determine which document is more important to a user who uses the preceding-document scanning unit.

Additionally, the image scanning unit of exemplary aspects of the invention preferably may have a printing unit that prints images scanned by the first scanning unit or the second scanning unit, and a print limiting unit that limits a start instruction of the job using the printing unit, when the instructing unit sends an instruction to start the scanning while the preceding-document scanning unit performs the scanning operation by using the printing unit. When the instructing unit sends the scanning start instruction while the preceding-document scanning unit performs the scanning operation by using the printing unit, it causes disadvantages to a user who is using the preceding-document scanning unit. Accordingly, it is preferable to limit the instruction of such process.

According to aspects of the invention, it is established that an image scanning apparatus, which has a plurality of scanning units, can effectively use the respective scanning units.

DETAILED DESCRIPTION OF ILLUSTRATIVE ASPECTS

Hereinafter, illustrative aspects of an image scanning apparatus of the invention will be described with reference to the drawings. The illustrative aspects relate to a Multi Function Peripheral (hereinafter referred as to MFP) having scanning operation, printing and FAX transmission/reception functions to which the invention is applied.

[Configuration of MFP]

Figure 1:
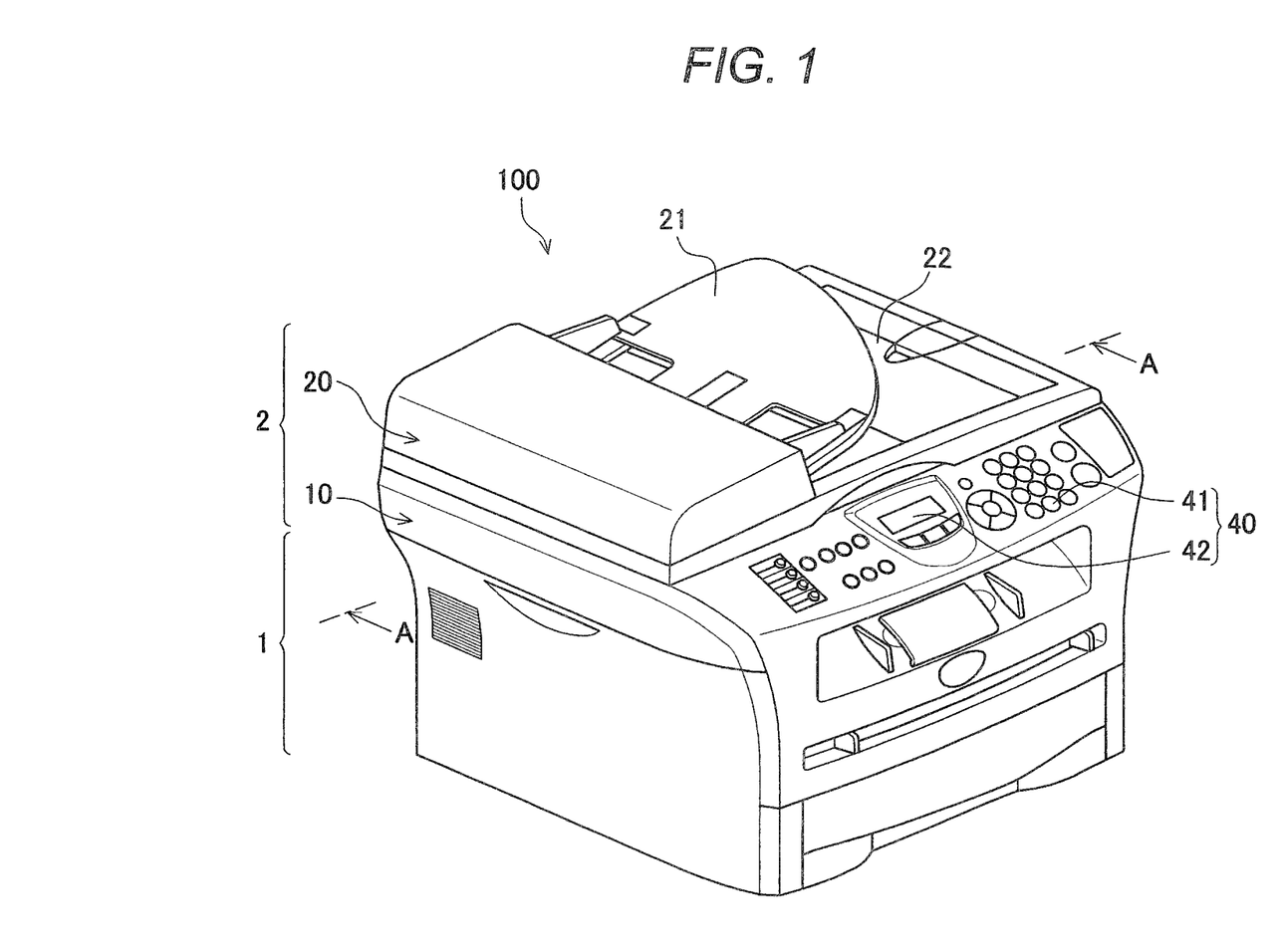
FIG. 1 is a perspective view showing an external appearance of a Multi-Function Peripheral (hereinafter referred to as MFP) according to an illustrative aspect.

As shown in FIG. 1, a MFP 100 in the illustrative aspect includes an image forming unit 1 (an example of a printing unit) that prints an image on a sheet and an image scanning unit 2 that scans an image of a document. An image forming method of the image forming unit 1 may be an electro-photography method or inkjet method. In addition, the image forming unit may possible be able to form a color image or form only a black-white image.

A front side of the MFP 100 has a button group 41 including a variety of buttons (for example, start key, stop key and ten keys) and an operation panel 40 including a display unit 42 configured by liquid crystal display, etc. By using the display unit 42 or button group 41, it is possible to display an operation status and allow the input operation by the user.

[Configuration of Image Scanning Unit]

Figure 2:
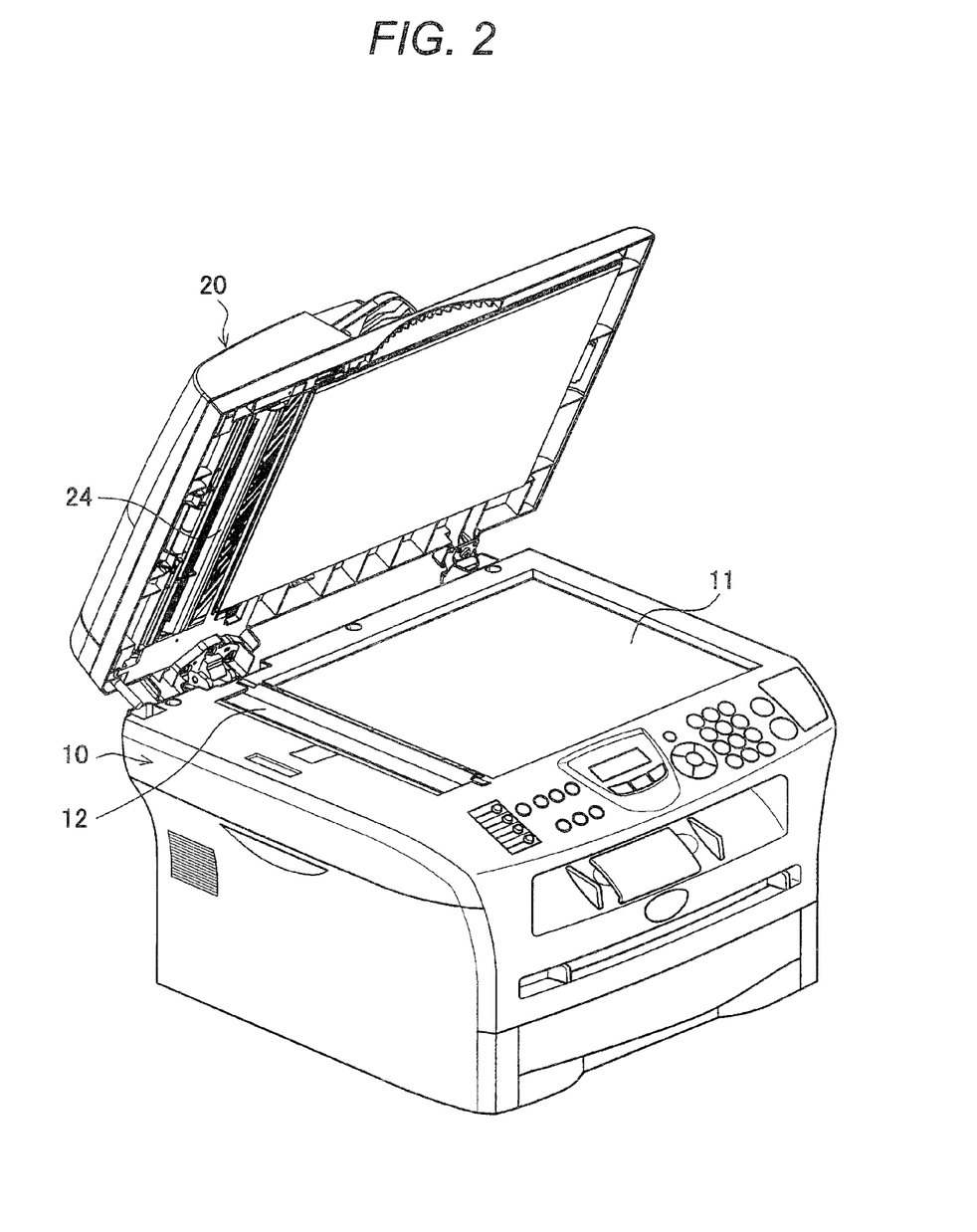
FIG. 2 is a perspective view showing a state in which an Auto Document Feeder (hereinafter referred to as ADF) of the MFP shown in FIG. 1 is opened.
Figure 3:
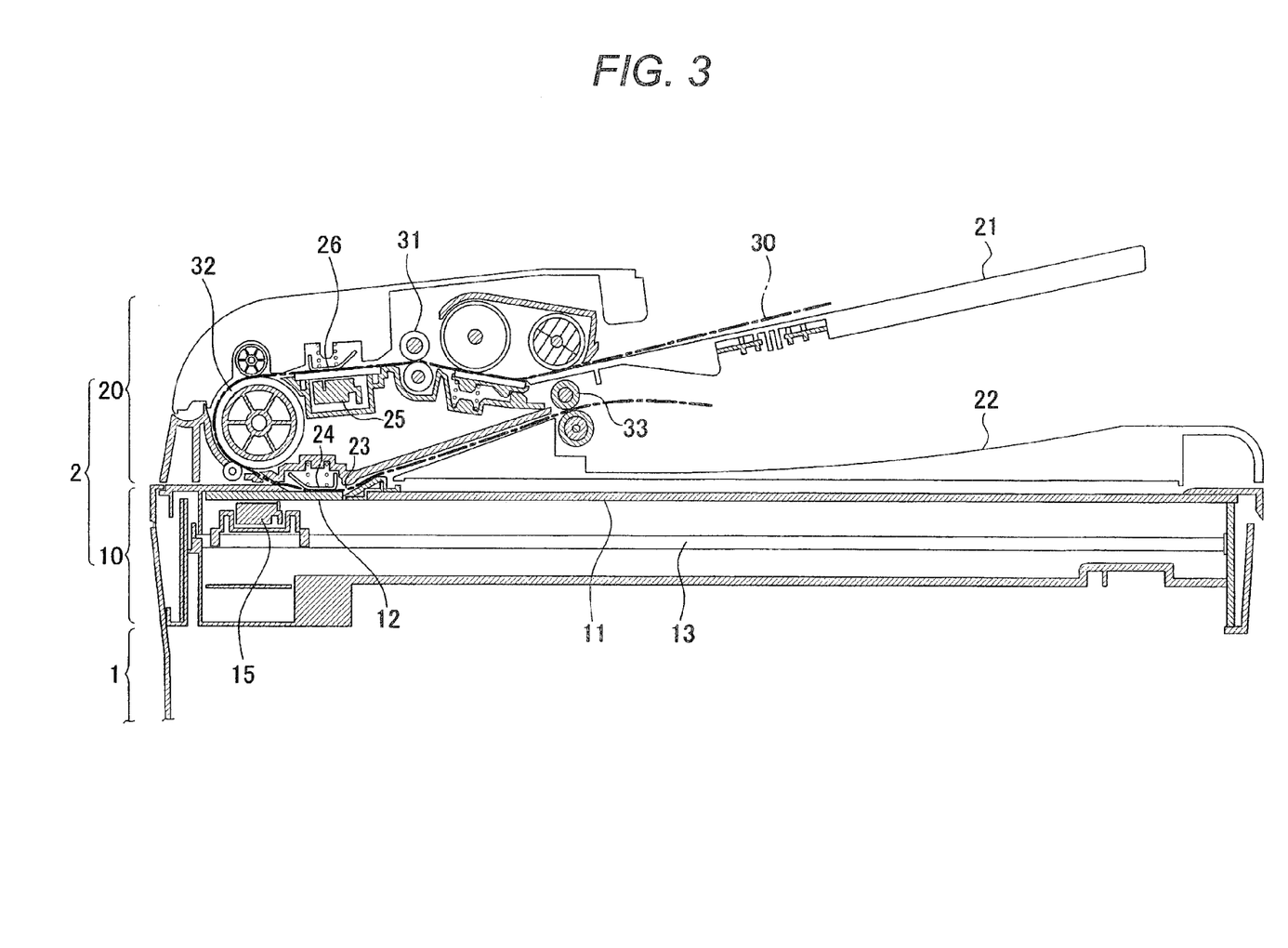
FIG. 3 is a sectional view showing an internal configuration (cross section along a line A-A) of an image scanning unit of the MFP shown in FIG. 1.

The configuration of the image scanning unit 2 will be described with reference to FIGS. 1 to 3. FIG. 1 and FIG. 2 show an external appearance of the image scanning unit 2, and FIG. 3 shows an internal configuration of the image scanning unit 2.

The image scanning unit 2 has a main body unit 10 that scans an image and an Auto Document Feeder (hereinafter referred to as ADF; an example of a feeding unit) 20 that performs automatic feeding of the document. The ADF 20 is provided at an upper part of the main body unit 10. One side of the ADF is connected to the main body unit 10 and is rotatable relative to the main body unit 10. Consequently, the ADF 20 can be opened and closed at an upper surface of the main body unit 10 (refer to FIG. 2), and the ADF 20 serves as a cover covering the upper surface of the main body unit 10.

The main body unit 10 has contact glasses 11, 12 at its upper surface. Further, an image sensor 15 (an example of a first scanning unit) that scans an image of a document is provided in the main body unit 10 and below the contact glasses 11, 12. The image sensor 15 includes optic devices aligned in a line in a main scanning direction (a direction orthogonal to a document feeding direction, a depth direction of FIG. 3), converts reflective light from the document into an electric signal, and outputs the electric signal. A Contact Image Sensor (CIS) or Charge Coupled Device (CCD) may be used as the image sensor 15.

The image sensor 15 is supported slidably to a slide shaft 13. The slide shaft 13 is provided in a sub-scanning direction (a document feeding direction, a left-right direction of FIG. 3). Both end portions of the slide shaft are fixed to a housing of the main body unit 10. Accordingly, the image sensor 15 is movable in the left and right direction of FIG. 3.

The ADF 20 includes a document inlet 21 in which the document to be scanned is set and a discharge outlet 22 that scanned documents are discharged. Specifically, the document inlet 21 is provided above the discharge outlet 22.

Further, a document feed path 30 is provided in the ADF 20. The document feed path 30 has an approximate U shape and connects the document inlet 21 and the discharge outlet 22. In the feed path 30, an entry roller 31, a main roller 32 and a discharge roller 33 are provided in that order from an upstream of the document feeding direction.

Also, an opening 23 is provided at lower surface of the ADF 20, and a document pushing plate 24 is arranged to expose from the opening 23. The document pushing plate 24 is provided between the downstream of the main roller 32 and the upstream of the discharge roller 33 in the document feeding direction, and the document pushing plate 24 faces the contact glass 12 in case that the ADF 20 is closed.

The ADF 20 picks up the documents set on the document inlet 21 one at a time by the entry roller 31 and causes the document to U-turn along the main roller 32. Then, the ADF feeds the document to a position facing to the contact glass 12 of the main body unit 10 (hereinafter, referred to as "ADF glass 12"). Specifically, the ADF causes the document to pass between the document pushing plate 24 and the ADF glass 12. Then, the ADF discharges the document to the discharge outlet 22 via the discharge roller 33.

The document scanning method using the image sensor 15 includes a flat bed method (document-fixed scanning method) and an ADF method (document moving scanning method). For the flat bed method, the documents are set on the contact glass 11 (hereinafter, referred to as "FB glass 11") one by one. At this state, the image sensor 15 is moved in the sub-scanning direction and an image of the document is scanned line by line in the sub-scanning direction. On the other hand, for the ADF method, the documents to be scanned are set on the document inlet 21. Then, the image sensor 15 is moved to a position facing to the ADF glass 12 and fixed. At this state, the document is fed to the position below the document pushing plate 24 and facing to the ADF glass 12, by the ADF 20. An image of the document is scanned line by line in the main-scanning direction at the time.

Further, the ADF 20 includes an image sensor 25 (an example of a second scanning unit), which scans an image of a document, and a document pushing plate 26 facing to the image sensor 25 in the downstream of the entry roller 31 and the upstream of the main roller 32 with respect to the document feeding direction. The image sensor 25 and the document pushing plate 26 are arranged to pass the document therebetween. Similar to the image sensor 15 of the main body unit 10, a CIS or CCD may be used as the image sensor 25.

The image sensor 25 is arranged at a position to scan the other surface different from the one surface to be scanned in the ADF method by using the image sensor 15. Accordingly, the image scanning unit 2 may scan one side of a document by the image sensor 15 of the main body unit 10 and may scan the other side by the image sensor 25 in the ADF 20 at one pass, respectively. Consequently, the image scanning unit may perform a double-sided scanning in one pass.

[Electric Configuration of MFP]

Figure 4:
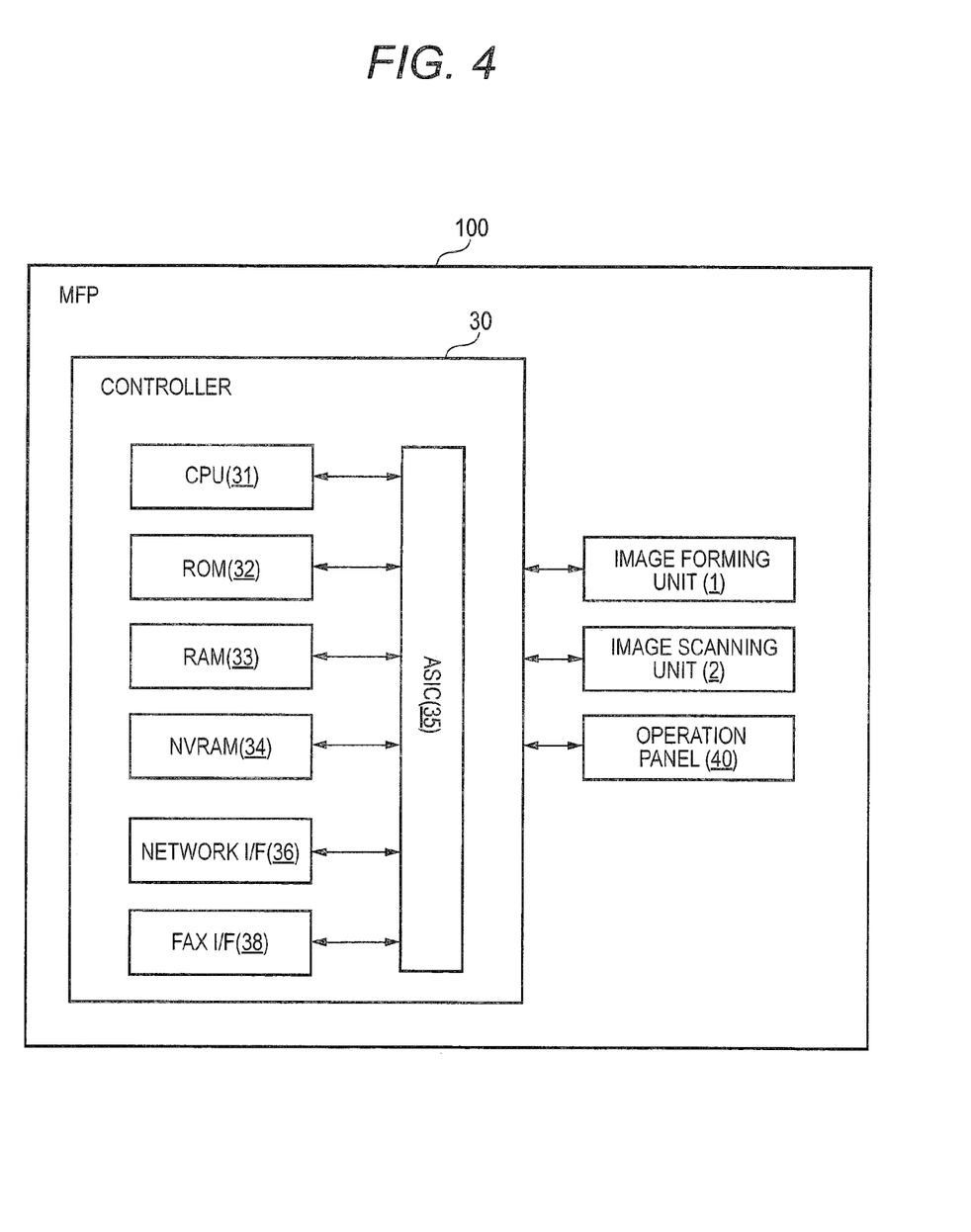
FIG. 4 is a block diagram showing an electric configuration of the MFP shown in FIG. 1.

An electric configuration of the MFP 100 will be described. As shown in FIG. 4, the MFP 100 has a controller 30 including a CPU 31 (an example of the instructing unit, the executing unit, the notifying unit, the limiting unit and the print limiting unit), a ROM 32, a RAM 33, a NVRAM 34, an ASIC 35, a network interface 36, a USB interface 37 and a FAX interface 38.

The ROM 32 stores such various control programs for the MFP 100 or image processing programs and various settings or initial values. The RAM 33 is used as a work area to which the control programs are read out or a storage area that temporarily stores the image data.

The ASIC 35 is connected electrically to the image forming unit 1, the image scanning unit 2, the operation panel 40 and the like. For example, the ASIC 35 requires a signal of image data from the image scanning unit 2. The ASIC outputs a signal for forming an intended image to the image forming unit 1. Further, the ASIC receives signals of the various buttons input from the button group 41. The ASIC outputs a signal of content to be displayed on the display unit 42.

The CPU 31 controls the parts of the MFP 100 via the ASIC 35 with storing a processing result in the RAM 33 or NVRAM 34, according to the control programs read out from the ROM 32. For example, the CPU 31 executes the image processing with the image data acquired from the image scanning unit 2, according to the image processing program read out from the ROM 32.

The network interface 36 connects an information device and enables data communication via the network interface 36 to each other. The FAX interface 38 is connected to a telephone line. The MFP can perform data communication with an external FAX apparatus, and the like, via the FAX interface 38.

[Simultaneous Scanning Operation of Two Jobs of MFP]

Next, an operation, in which documents of two different jobs are scanned at the same time in the image scanning unit 2 of the MFP 100, will be described.

The MFP 100 of this illustrative aspect has the two image sensors 15, 25, and the MFP executes simultaneously two jobs including the scanning operation. In other words, while one image sensor in MFP 100 performs one scanning operation of one job (hereinafter, referred to as "preceding-job"), the other image sensor in MFP 100 performs another scanning operation of a document of another job (hereinafter, referred to as "following-job").

For example, while performing a scanning operation of a document with high resolution by the flat bed method, i.e., while performing the scanning operation by using the image sensor 15, it is possible to set the other documents on the ADF 20 and to perform a scanning of the documents by using the image sensor 25. Alternatively, while performing a continuous scanning operation of many documents by the image sensor 25 in the ADF 20, it is possible to set a document on the FB glass 11 and to perform a scanning of the document by the image sensor 15.

Incidentally, the method of setting a document of the following-job on the FB glass 11 may be as follows. As a method 1, a document may be inserted through a gap between the ADF 20 and the main body unit 10. As a method 2, the scanning operation of the ADF 20 is temporarily stopped, opening the ADF 20, and the document is set on the FB glass 11. As a method 3, a document is set before a scanning operation of the preceding-job starts.

In case that using the simultaneous scanning function, a user inputs a simultaneous scanning instruction, which instructs an input of a following-job, by the operation panel 40 during the scanning process of the preceding-job. After that, the user sets a document of the following-job and inputs a start instruction, which instructs a start of the following-job. The MFP 100 starts a simultaneous scanning when the start instruction is input.

[Simultaneous Scanning Process of MFP]

Figure 5:
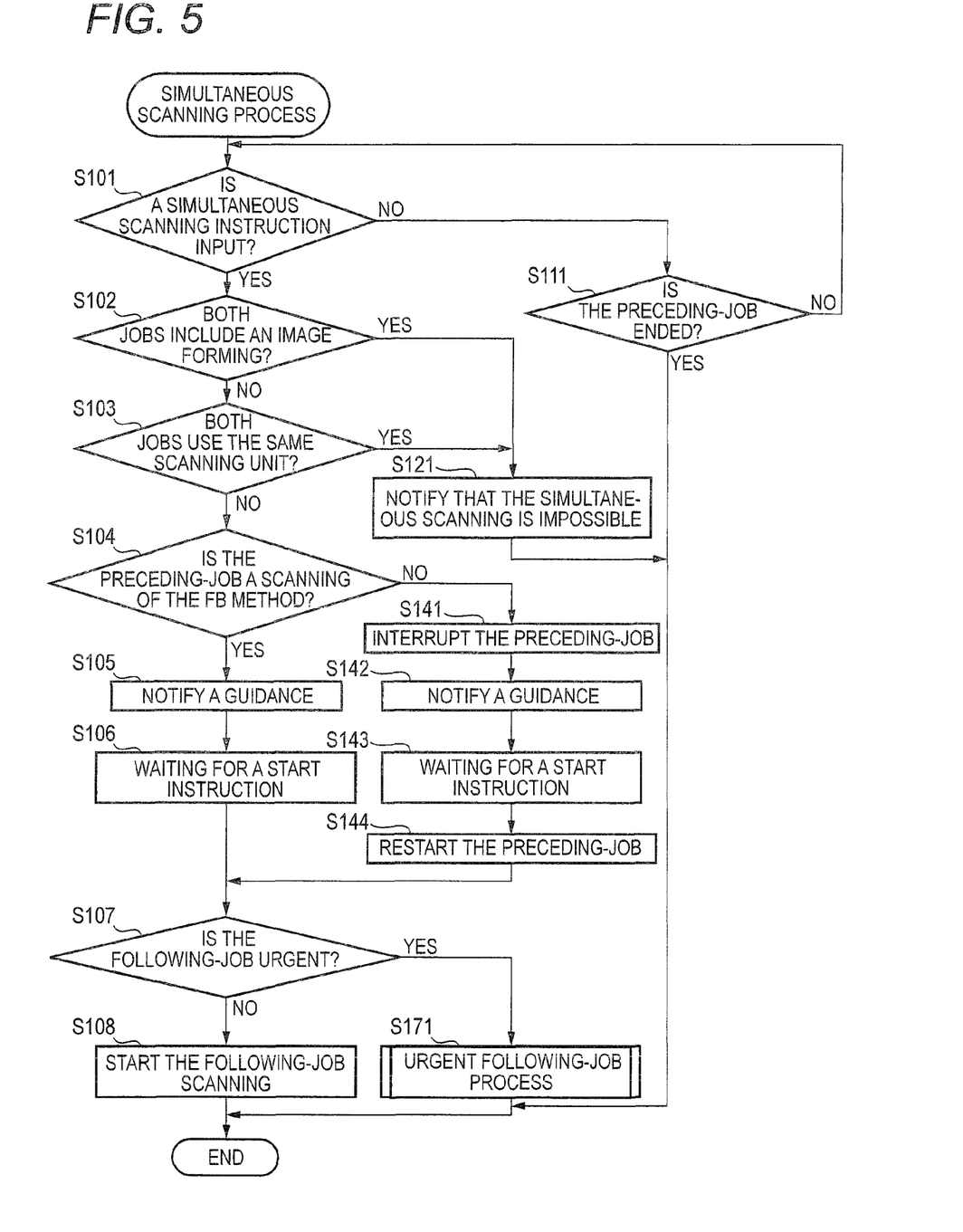
FIG. 5 is a flow chart showing a sequence of a simultaneous scanning process of the MFP.

A sequence of a simultaneous scanning process executing the simultaneous scanning function will be described with reference to a flow chart of FIG. 5. The simultaneous scanning process is executed when a scanning process of a preceding-job is started.

First, it is determined whether a simultaneous scanning instruction is input (step S101). When simultaneous scanning instruction is not input (step S101: NO), it is determined whether a preceding-job is ended (step S111). When the preceding-job is not ended (step S111: NO), the process returns to S101. When the preceding-job is ended (step S111: YES), the process is ended.

When a simultaneous scanning instruction is input (step S101: YES), a setting of contents of a following-job is accepted. Then, the process monitors a setting operation by the user, and it is determined whether the user has selected that both the preceding-job and the following-job use a same processing unit.

Specifically, in this illustrative aspect, the process determines whether both jobs are jobs including an image forming (step S102). For example, the job including the image forming is corresponding to a copy job, etc. The MFP 100 includes only one image forming unit, so that the MFP 100 cannot perform the image forming at the same time. Accordingly, when both jobs includes an image forming (step S102: YES), the process notifies that the simultaneous scanning is impossible (step S121). The notifying unit may notify a user with a message displayed on the display unit 42 or an alarming sound. After the notification in step S121, the process is ended. When another job (for example, FAX receiving job), which does not perform the scanning in addition to the preceding-job, uses the image forming unit 1, the process may notifies the user that the simultaneous scanning is impossible, similar to the step S121.

When both of the jobs do not include an image forming (step S102: NO), the process determines whether the both jobs use the same scanning unit (step S103). For example, when a double-sided scanning operation by the ADF 20 is designated while the preceding-job performs the scanning operation by the FB method, it is determined that both jobs use the same scanning unit. When both of the jobs use the same scanning unit (S103: YES), the process also notifies that the simultaneous scanning is impossible (S121). After the notification in step S121, the process is ended.

Figure 6:
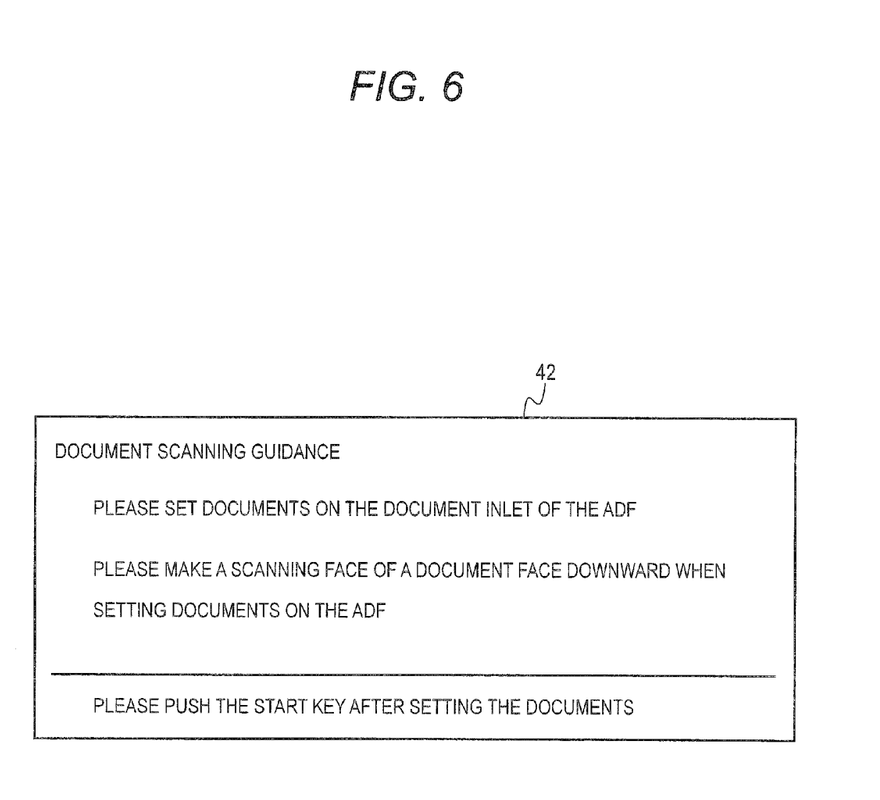
FIG. 6 is a view showing a display example of a document scanning guidance.

In the meantime, when both of the jobs use the different scanning units (step S103: NO), the process determines whether the preceding-job is a scanning of the FB method (step S104). When the preceding-job is a scanning operation by the FB method, i.e., the preceding-job is scanned by using the image sensor 15 (step S104: YES), a guidance of setting documents on the ADF 20 is notified on the display unit 42 (S105). Specifically, as shown in FIG. 6, the notification notifies the user so that the user can understand a scanning face when setting the documents. Consequently, the following-job is scanned by using the image sensor 25. A surface scanned by the image sensor 25 is notified to the user, so that it is possible to suppress an operation mistake of the user.

After the notification of the guidance in step S105, the process waits for an input of the start instruction (step S106). After the start instruction is input, the process proceeds to step S107. In the meantime, when a cancel key for interrupting the simultaneous scanning is pushed while waiting the input in step S106, the process returns to S101.

On the other hand, when the preceding-job is not executed by the using FB method, i.e., the preceding-job is executed by using the ADF 20 (S104: NO), the scanning operation of the preceding-job is interrupted (S141). For example, the interrupt of the scanning operation includes an interrupt of feed of a following-document. The opening 23 is provided adjacent to the document pushing plate 24 at lower surface of the ADF 20. When the ADF 20 is opened to set a document on the FB glass 11 with feeding a document in the ADF 20, the document may flow out from the opening 23 adjacent to the document pushing plate 24. Accordingly, the document feed of the ADF 20 is interrupted.

Next, guidance for setting a document on the FB glass 11 is displayed by the display unit 42 (step S142). After the notification of the guidance in step S142, the process waits for an input of the start instruction (step S143). After a start instruction is input, the scanning operation of the preceding-job is restarted (step S144), and the process proceeds to step S107.

In addition, in case that the above-described method 1 or method 3 is used as the method of setting the document of the following-job on the FB glass 11, the scanning operation of the preceding-job may not be interrupted. In other words, when there is no concern about the outflow of the document, the processes of step S141 and step S144 may be omitted.

After step S106 or step S144, the process determines whether the urgency of the following-job is higher or lower than that of preceding-job (S107). In the MFP 100, it is possible to set a degree of urgency when inputting a start instruction. Accordingly, the degree of urgency is confirmed to determine a level of the urgency in step S107.

When the urgency of the following-job is lower than that of the preceding-job (S107: NO), a scanning operation of the following-job starts (S108). As a result, the preceding-job and the following-job operate at the same time. In other words, one job uses the image sensor 15 to scan the document and the other job uses the image sensor 25 to scan the document. After the scanning operation of the following-job starts, the process is ended.

Figure 7:
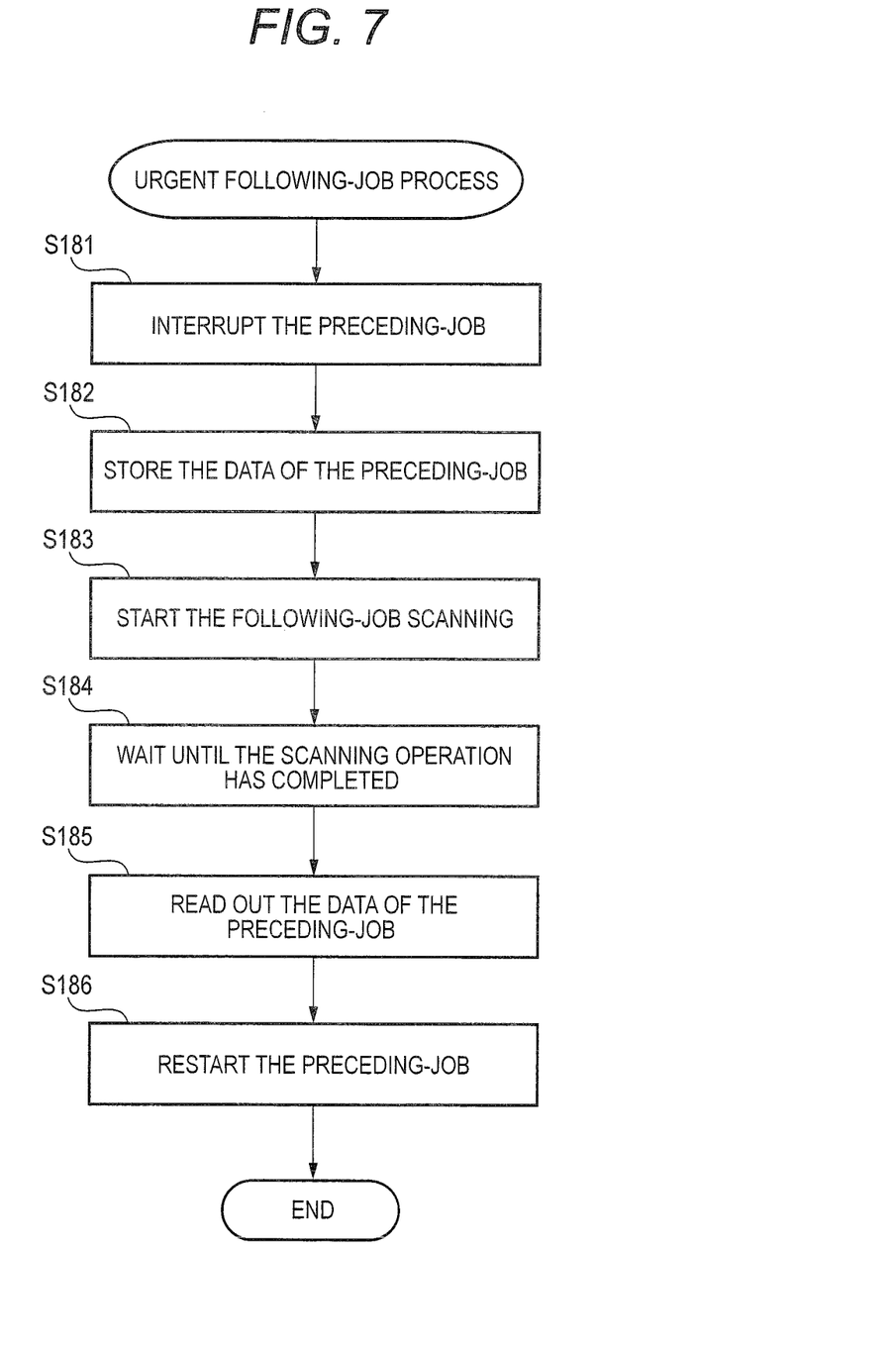
FIG. 7 is a flow chart showing a sequence of an urgent scanning process of the MFP.

In the meantime, when the urgency of the following-job is higher than that of preceding-job (step S107: YES), an urgent following-job process, which performs a scanning operation of the following-job with priority, is executed (step S171). FIG. 7 shows a sequence of the urgent following-job process (an example of the requesting unit and the restarting unit) in step S171.

In the urgent following-job process, the operation of the preceding-job is stopped first (S181), then the data of the preceding-job is stored (S182). For example, in case that the preceding-job includes the scanning operation by the image sensor 15 of the FB method, the stopped position and the image data during the scanning operation, and the like, are stored. In addition, in case that the preceding-job includes a scanning operation by using the image sensor 25 of the ADF 20, the image data corresponding to the scanned document, and the like, are stored.

After that, a scanning operation of the following-job is started (step S183). Thereby, the following-job is performed with priority to the preceding-job. Then, the process waits for completion of the scanning operation of the following-job (step S184).

After the scanning operation of the following-job is completed, the data of the preceding-job stored in step S182 is read out (step S185). The operation of the preceding-job is restarted based on the read data (step S186). After the restart, the urgent following-job process is ended, and further the simultaneous scanning process is ended.

As just described, in the urgent following-job process, the scanning of the preceding-job is interrupted and the image data scanned in the preceding-job is stored. Thus, the following-job uses preferentially the CPU, the memory and the like. Accordingly, it is possible to complete the process of the following-job at early stages.

As described above, the image scanning unit 2 of the MFP 100 in the illustrative aspect includes both the image sensor 15 in the main body unit 10 and the image sensor 25 in the ADF 20, and the image scanning unit 2 can scan both sides of a document at one pass. While one image sensor is performing one scanning operation of one job, it is possible to instruct a scanning operation using the other image sensor of the other job. Accordingly, the MFP 100 can execute the following-job by using the other image sensor while executing the preceding-job by using the one image sensor. Thereby, both of the image sensors are effectively used.

The above illustrative aspect shows just one of the examples and does not limit the invention. Accordingly, the invention includes various modifications and changed without departing from the scope of the invention. For example, the invention is not limited to the MFP and may be applied to an apparatus having an image scanning function, such as a copier, scanner, FAX and the like.

In the above illustrative aspect, when the preceding-job is the ADF scanning operation by using the image sensor 25, the scanning is once stopped and then the simultaneous scanning with the following-job starts. However, the invention is not limited thereto. For example, in case that a components is provided at the lower surface of the ADF 20 for preventing a flowing out from the opening 23 adjacent to the document pushing plate 24 (for example, a transparent film covering the opening 23 or a transparent wire of preventing the document), and the document is passed between the transparent film or wire and the document pushing plate 24, the scanning job may not be interrupted.

In the above illustrative aspect, when the conditions, in which the simultaneous scanning with the preceding-job cannot be executed, is set in step S102 or step S103, it is notified that the simultaneous scanning is impossible. However, the invention is not limited thereto. For example, it may be previously set that such conditions cannot be selected.

In the above illustrative aspect, when both the preceding-job and the following-job use the same image sensor or when the both jobs include the printing operation, the simultaneous scanning of the following-job is limited. However, the invention is not limited thereto. In other words, even in the combination, the simultaneous scanning of the following-job may be permitted. However, when the both jobs are executed at the same time, the output documents should be sorted, and this creates the additional problems. Thus, for example, the operation of the preceding-job is interrupted before starting the following-job, the following-job may be preferentially executed, and the operation of the preceding-job restarts after the execution of the following-job has completed. In addition, when a plurality of discharge outlets for printed documents is provided and when the documents of the preceding-job and the following-job may be separately discharged, the additional problems are avoided.

What is claimed is:

1. An image scanning device comprising:
a document tray;
a feeder configured to feed a document set on the document tray;
a first reader configured to read a surface, which faces upwardly during setting on the document tray, of the document, which is fed by the feeder, and a surface, which faces a flat-bed glass, of a document, which is statically set on the flat-bed glass;
a second reader configured to read a surface, which faces downwardly during setting on the document tray, of the document, which is fed by the feeder;
a display; and
a processor comprising hardware configured to:
determine, when there is an instruction to execute an automatic-document-feeder reading in which an image of a second document fed by the feeder is read, whether a flat-bed reading in which an image of a first document set on the flat-bed glass is read by scanning of the first reader, the automatic-document-feeder reading including: a first automatic-document-feeder reading, in which an image of the second document fed by the feeder is read by the second reader; a second automatic-document-feeder reading, in which the first reader moves to a predetermined position and then an image of the surface, which faces upwardly during setting on the document tray, of the document fed by the feeder is read by the first reader; and a double-sided reading;
execute, when it is determined that the flat-bed reading is not being performed, one of the second automatic-document-feeder reading and the double-sided reading,
display, when the flat-bed reading is being performed, a guidance encouraging a user to put the document such that a document surface to be read faces downwardly on the document tray;
wait for receiving the start instruction of the first automatic-document-feeder reading after displaying the guidance; and
execute, when the start instruction is received after displaying the guidance, the first automatic-document-feeder reading.

2. A multifunctional device comprising:
the image scanning device according to claim 1; and
a printing device,
wherein the processor is configured to:
determine whether both a job of the flat-bed reading with respect to the first document and a job of the first automatic-document-feeder reading cause the printing device to print results of the both reading; and
display, when it is determined that both the job of the flat-bed reading with respect to the first document and the job of the first automatic-document-feeder reading cause the printing device to print results of the both of the jobs, a notice to indicate that it is impossible to simultaneously execute the both of the jobs, on the display.

3. The image scanning device according to claim 1,
wherein the processor is configured to:
receive an urgency of the flat-bed reading and an urgency of an automatic-document-feeder reading;
determine whether the urgency of the automatic-document-feeder reading is higher than the urgency of the flat-bed reading;
interrupt, in response to determination that the urgency of the automatic-document-feeder reading is higher than the urgency of the flat-bed reading, the flat-bed reading by the first reader and then execute the automatic-document-feeder reading to read the first document fed by the second reader; and
execute, in response to determination that the urgency of an automatic-document-feeder reading is lower than the urgency of the flat-bed reading, the flat-bed reading and automatic-document-feeder reading to cause the first reader and the second reader to simultaneously read.

4. The image scanning device according to claim 3,
wherein, when the processor interrupts the flat-bed reading using the first reader, the processor stores a stopped position of the first reader in the flat-bed reading using the first reader, and
wherein, after the automatic-document-feeder reading using the second reader is completed, the processor restarts the flat-bed reading using the first reader based on the stored stopped position.

5. A method of controlling an image scanning device comprising: a document tray; a feeder configured to feed a document set on the document tray; a first reader configured to read a surface, which faces upwardly during setting on the document tray, of the document, which is fed by the feeder, and a surface, which faces a flat-bed glass, of a document, which is statically set on the flat-bed glass; a second reader configured to read a surface, which faces downwardly during setting on the document tray, of the document, which is fed by the feeder; and a display; the method controlling the image scanning device to:
determine, when there is an instruction to execute an automatic-document-feeder reading in which an image of a second document fed by the feeder is read, whether a flat-bed reading in which an image of a first document set on the flat-bed glass is read by scanning of the first reader, the automatic-document-feeder reading including: a first automatic-document-feeder reading, in which an image of the second document fed by the feeder is read by the second reader; a second automatic-document-feeder reading, in which the first reader moves to a predetermined position and then an image of the surface, which faces upwardly during setting on the document tray, of the document fed by the feeder is read by the first reader; and a double-sided reading;

execute, when it is determined that the flat-bed reading is not being performed, one of the second automatic-document-feeder reading and the double-sided reading;

display, when it is determined that the flat-bed reading is being performed, a guidance encouraging a user to put the document such that a document surface to be read faces downwardly on the document tray;

wait for receiving the start instruction of the first automatic-document-feeder reading after displaying the guidance; and execute, when the start instruction is received after displaying the guidance, the first automatic-document-feeder reading.

6. The method according to claim 5 further controlling a multifunctional device comprising the image scanning device and a printing device, the method further controlling the multifunctional device to:

determine whether both a job of the flat-bed reading with respect to the first document and a job of the first automatic-document-feeder reading cause the printing device to print results of the both reading; and display, when it is determined that both the job of the flat-bed reading with respect to the first document and the job of the first automatic-document-feeder reading cause the printing device to print results of the both of the jobs, a notice to indicate that it is impossible to simultaneously execute the both of the jobs, on the display.

7. The method of controlling the image scanning device according to claim 5, the method further controlling the image scanning device to:

receive an urgency of the flat-bed reading and an urgency of an automatic-document-feeder reading;

determine whether the urgency of the automatic-document-feeder reading is higher than the urgency of the flat-bed reading;

interrupt, in response to determination that the urgency of the automatic-document-feeder reading is higher than the urgency of the flat-bed reading, the flat-bed reading by the first reader and then execute the automatic-document-feeder reading to read the first document fed by the second reader; and execute, in response to determination that the urgency of an automatic-document-feeder reading is lower than the urgency of the flat-bed reading, the flat-bed reading and automatic-document-feeder reading to cause the first reader and the second reader to simultaneously read.

8. The method of controlling the image scanning device according to claim 7, the method further controlling the image scanning device to:

store, when the flat-bed reading using the first reader is interrupted, a stopped position of the first reader in the flat-bed reading using the first reader; and restart, after the automatic-document-feeder reading using the second reader is completed, the flat-bed reading using the first reader based on the stored stopped position.

9. A non-transitory computer-readable medium having instructions controlling an image scanning device comprising: a document tray; a feeder configured to feed a document set on the document tray; a first reader configured to read a surface, which faces upwardly during setting on the document tray, of the document, which is fed by the feeder, and a surface, which faces a flat-bed glass, of a document, which is statically set on the flat-bed glass; a second reader configured to read a surface, which faces downwardly during setting on the document tray, of the document, which is fed by the feeder; and a display; the instructions controlling the image scanning device to:

determine, when there is an instruction to execute an automatic-document-feeder reading in which an image of a second document fed by the feeder is read, whether a flat-bed reading in which an image of a first document set on the flat-bed glass is read by scanning of the first reader, the automatic-document-feeder reading including: a first automatic-document-feeder reading, in which an image of the second document fed by the feeder is read by the second reader; a second automatic-document-feeder reading, in which the first reader moves to a predetermined position and then an image of the surface, which faces upwardly during setting on the document tray, of the document fed by the feeder is read by the first reader; and a double-sided reading;

execute, when it is determined that the flat-bed reading is not being performed, one of the second automatic-document-feeder reading and the double-sided reading;

display, when it is determined that the flat-bed reading is being performed, a guidance encouraging a user to put the document such that a document surface to be read faces downwardly on the document tray;

wait for receiving the start instruction of the first automatic-document-feeder reading after displaying the guidance; and execute, when the start instruction is received after displaying the guidance, the first automatic-document-feeder reading.

10. The non-transitory computer-readable medium having instructions according to claim 9, the instructions further controlling a multifunctional device including the image scanning device and a printing device, the instructions further controlling the multifunctional device to:

determine whether both a job of the flat-bed reading with respect to the first document and a job of the first automatic-document-feeder reading cause the printing device to print results of the both reading; and display, when it is determined that both the job of the flat-bed reading with respect to the first document and the job of the first automatic-document-feeder reading cause the printing device to print results of the both of the jobs, a notice to indicate that it is impossible to simultaneously execute the both of the jobs, on the display.

11. The non-transitory computer-readable medium having instructions controlling the image scanning device according to claim 9, the instructions further controlling the image scanning device to:

receive an urgency of the flat-bed reading and an urgency of an automatic-document-feeder reading;

determine whether the urgency of the automatic-document-feeder reading is higher than the urgency of the flat-bed reading;

interrupt, in response to determination that the urgency of the automatic-document-feeder reading is higher than the urgency of the flat-bed reading, the flat-bed reading by the first reader and then execute the automatic-document-feeder reading to read the first document fed by the second reader; and execute, in response to determination that the urgency of an automatic-document-feeder reading is lower than the urgency of the flat-bed reading, the flat-bed reading and automatic-document-feeder reading to cause the first reader and the second reader to simultaneously read.

12. The non-transitory computer-readable medium having instructions controlling the image scanning device according to claim 11, the instructions further controlling the image scanning device to:
- store, when the processor interrupts the flat-bed reading using the first reader, a stopped position of the first reader in the flat-bed reading using the first reader; and
- restart, after the automatic-document-feeder reading using the second reader is completed, the flat-bed reading using the first reader based on the stored stopped position.

\* \* \* \* \*